June 30, 1936. E. A. COLBY 2,045,632
PERTUSED CATALYZER
Filed Nov. 23, 1934 3 Sheets—Sheet 1

INVENTOR
Edward A. Colby,
BY
Harry B. Cook
ATTORNEY

June 30, 1936.  E. A. COLBY  2,045,632
PERTUSED CATALYZER
Filed Nov. 23, 1934   3 Sheets-Sheet 2
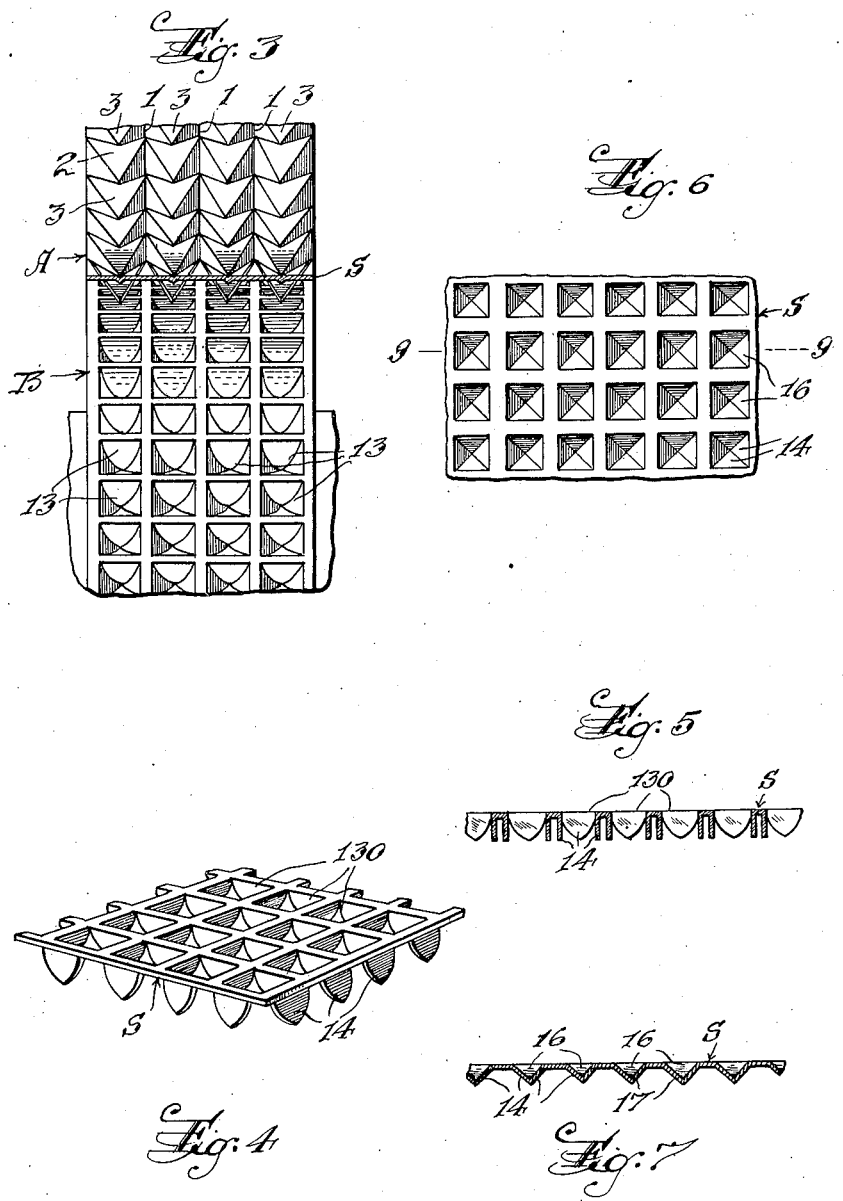
INVENTOR
Edward A. Colby,
BY
Harry B. Rook,
ATTORNEY June 30, 1936.   E. A. COLBY   2,045,632
PERTUSED CATALYZER
Filed Nov. 23, 1934   3 Sheets-Sheet 3
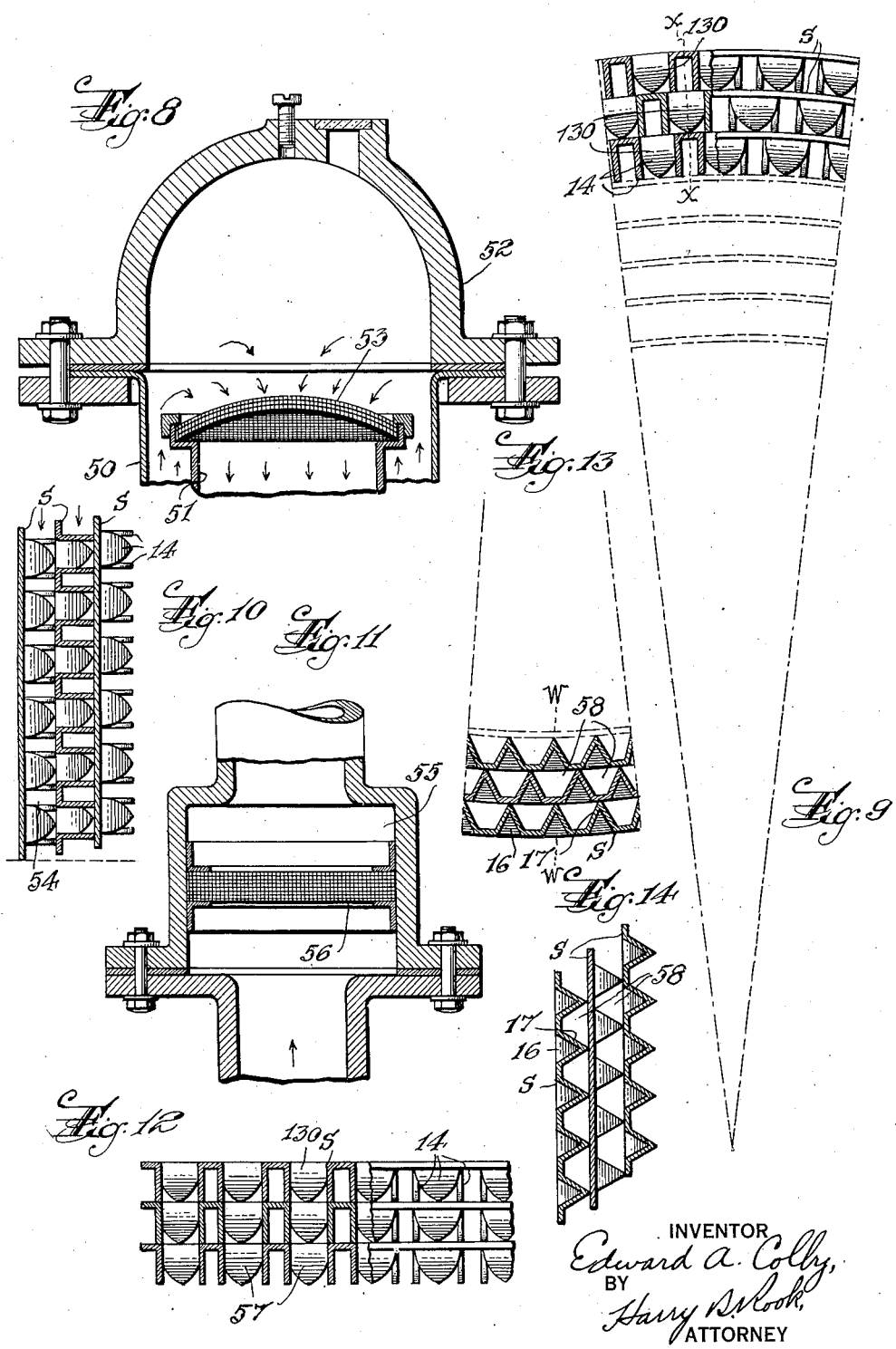
INVENTOR
Edward A. Colby,
BY
Harry B. Rook,
ATTORNEY Patented June 30, 1936

2,045,632

UNITED STATES PATENT OFFICE 2,045,632

PERTUSED CATALYZER

Edward A. Colby, Maplewood, N. J., assignor to Baker & Company, Inc., a corporation of New Jersey Application November 23, 1934, Serial No. 754,459
In the Netherlands February 2, 1933

3 Claims. (Cl. 23—234)

This invention relates to an improved catalyst for use in chemical reactions where a metallic catalytic agent is used, and this application is a continuation in part of my copending application Serial No. 473,730.

As one illustration, in one known method of producing nitric acid by the oxidation of ammonia, the mixture of air and ammonia gas is passed through fine mesh screens woven with platinum wire or alloys of the metal. Such screens vary in number of mesh openings from 45 to 150 per linear inch, and are woven with wire having a diameter from .0078 of an inch to .0016 of an inch. When the mixed gases in proper proportion come into contact with the platinum screen, chemical reaction takes place due to the catalytic action of platinum. As this action is exothermic, the platinum screens are raised to a high temperature from 700 to 900° C. This high temperature plus the pressure of rapidly flowing gases tends to distort the screens and alter the mesh opening. Since the chemical reactions take place at the surface of contact of the mixed gases with the platinum screen, it is most desirable to maintain uniformity of mesh opening and to so dispose the catalyzing metal as to expose to the gases the maximum surface of platinum per unit of its weight.

Theoretically in the application of this type of catalytic screen, the number of mesh openings per unit of screen area should be a practical maximum but the cross sectional area of the individual mesh opening should be relatively small compared with the surface area of its boundary walls in order that a maximum percentage of the mixed gases passing therethrough shall have physical contact with the catalyzing metal. While woven wire screens are most generally used, many trials of perforated sheet metal of relatively small surface area have been made such screens comprising thin sheets of platinum perforated by boring or punching small holes therein of approximately .009 of an inch in diameter and spaced .015 of an inch on centers. In a woven platinum wire screen having 80 openings per linear inch there are 6400 mesh openings per square inch of surface, the area of each opening with .003 inch diameter wire being approximately .000089 of a square inch. To bore or punch from thin sheet metal 6400 holes of this diameter per square inch of surface is a most difficult and expensive operation, especially when the surface area required runs into many hundreds of square inches for each screen.

Therefore the prime objects of the invention are to provide a catalyzer which shall have a large number of minute openings per square inch, a minimum of mass of metal with a maximum of exposed surface for contact with the gases, and substantial rigidity, and to provide such a catalyzer which shall be durable and easy to manufacture. The invention therefore contemplates a metallic catalyst of improved form consisting in a sheet of metal of thickness of the order of foil having closely spaced pertusions of small dimensions. This sheet is of the general nature of a screen but is superior to a woven wire screen as a catalyst in several important respects. It is easier to manufacture, it being possible to form the sheet from a thin sheet of metal by a single simple operation. The sheet is effective and economical as a catalyst as the pertusions can be made of minute size and a large total contact area is provided in relation to the amount of metal required. Furthermore since the sheet is integral there is no chance of displacement of its parts, as there is of the wires of a woven screen, and hence no chance of variation in the size of the openings during use. The sheet is also more adaptable for use in various types of catalyzer apparatus as will appear from the detailed description below.

The pertused sheet of the invention is also superior to a perforated sheet in that it is easier to manufacture, provides greater contact surface per unit weight of metal, is more rugged and is more adaptable for use in different types of apparatus. The term "pertused sheet" as used in this specification is intended to indicate that portions of material are displaced by a "stabbing" or thrusting action to form openings or indentations and remain integral with the sheet in the form of projections whereas in a perforated sheet the material is removed to form openings.

A feature of the invention is that the sheet is more rigid after pertusion than before. A sheet of metal foil which before pertusion is flexible and flimsy has much more "body" after pertusion and is comparatively rigid. This greater rigidity is of importance in use as a catalyst in that less support for the catalyst is required.

The invention also relates to a method and apparatus for making the pertused sheets and to the use of such sheets in catalyzer apparatus. The nature and advantages of the invention will be understood from the following description in connection with the accompanying drawings in which:

Figure 3 is a front elevation of the rolls illustrated in Figures 1 and 2;

Figure 4 is a fragmentary perspective view of a pertused sheet of material made in accordance with the invention;

Figure 5 is a vertical sectional view through the sheet;

Figure 6 is a top plan view of a sheet of material which has been indented, as for reenforcement, in accordance with the invention;

Figure 7 is a vertical sectional view on the line 9—9 of Figure 6;

Figure 8 is a fragmentary vertical longitudinal sectional view through a known type of catalyzer apparatus embodying the catalyzer unit formed of my pertused metal;

Figure 9 is an enlarged fragmentary, partial plan and partial horizontal sectional view of the catalyzer unit;

Figure 10 is a fragmentary transverse, vertical, sectional view on the line X—X of Figure 9;

Figure 11 is a vertical longitudinal sectional view through another form of catalyzer apparatus embodying my pertused sheet in another manner;

Figure 12 is a view on an enlarged scale, partially in section and partially in side elevation, of the catalyzer unit or grid shown in Figure 11;

Figure 13 is a horizontal sectional view through a catalyzer grid of the form shown in Figure 9 but embodying my indented non-perforated sheet, and Figure 14 is a fragmentary, transverse vertical sectional view on the line W—W of Figure 13.

Figure 1:
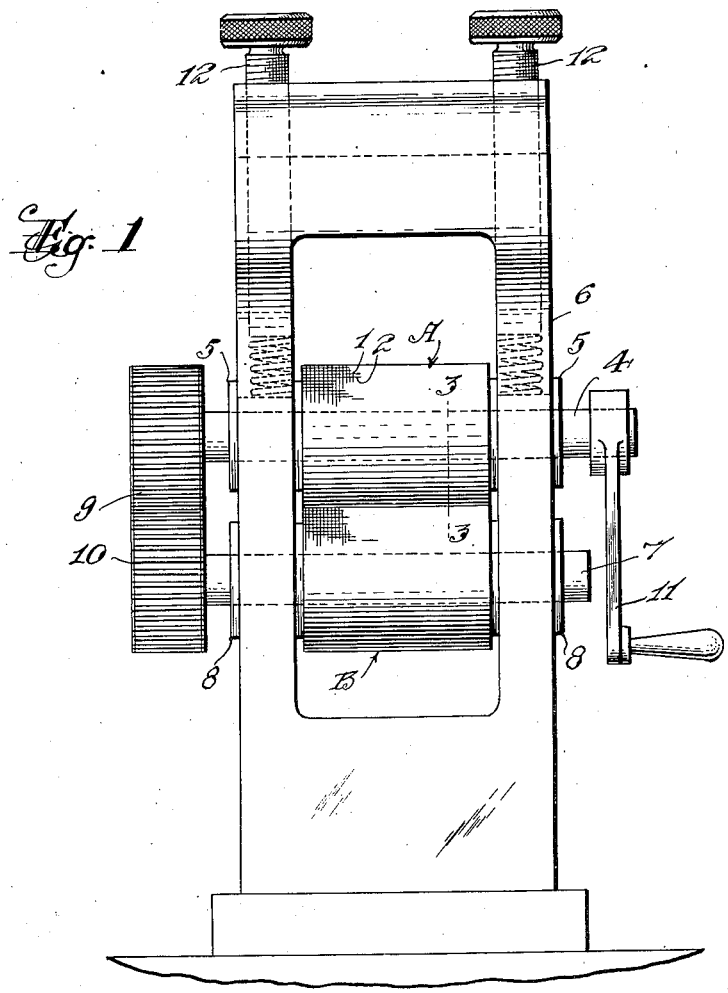
Figure 1 is a front elevation of one apparatus for producing minute pertusions or deformations on the surfaces of sheets of ductile material, in accordance with the invention.

Specifically describing the embodiment of the invention illustrated in Figures 1-5, inclusive, the reference character A designates a steel cylinder or roll of the desired diameter and length, and which has on its periphery a plurality of teeth to cooperate with corresponding recesses in a second cylinder or roll B, in pertusing a sheet. The diameter of the rolls will vary in accordance with the thickness of the sheets to be operated upon and the number of pertusions desired for each unit of area, while the length of the rolls will vary with the width of the sheet to be produced.

In making the roll A, a cylinder of high grade steel, for example, tool steel, has a groove 1 with or without lead, cut in its periphery of the desired pitch, shape and depth, according to known machine shop methods. The roll is then grooved longitudinally, as at 2, parallel to its axis, to form teeth 3, and preferably the longitudinal grooves or cross-cuts have the same shape, pitch and depth as the groove 1. The shape, pitch, and depth will of course vary with the size and shape of the teeth desired. After the roll has been so machined, it is hardened according to known processes.

The roll B may be made of the same or softer material, or may have a surface formed of softer material than the roll A, and copper alloys mounted on a steel shaft have been found to be very satisfactory.

If the material to be pertused is itself sufficiently hard to have a wearing action on the surfaces of the recesses in the roll B, the composition of this roll or its peripheral surface may be such that it can be hardened by heat treatment after formation of the recesses.

This roll B is formed with its recesses by a rolling action under the pressure between the two rolls A and B, which action may be performed in any suitable manner. As shown, the roll A may be mounted on a shaft 4 journaled in slide bearings 5 in a frame 6, while the roll B may be mounted on a shaft 7 mounted in slide bearings 8 in the frame. The two shafts are geared together by pinions 9 and 10, and one of the shafts may be rotated by a crank 11. The two rolls are forced together into peripheral contact as by compression screws 12 engaging the slide bearings 5 of the shaft 4. With the rolls thus arranged the peripheral faces are gradually forced together by the compression screws 12 while the rolls are rotated, and as the result the teeth 3 of the roll A are forced into the surface of the roll B so as to form recesses 13 corresponding in size and shape to the teeth 3. The two rolls being geared together, the spacing and alinement of the teeth and recesses are maintained extremely accurate, the recesses forming matrices of exactly the same shape, size and spacing as the teeth in the roll A.

Figure 2:
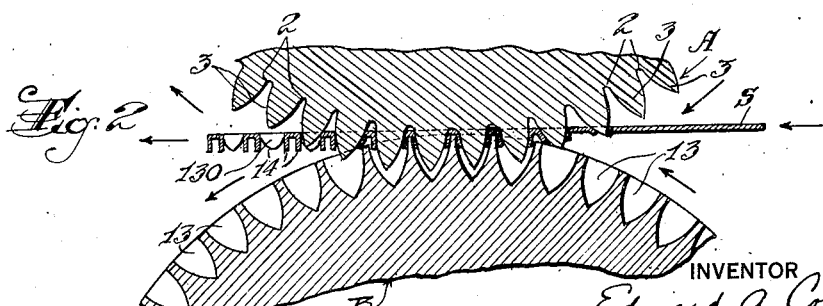
Figure 2 is an enlarged fragmentary transverse vertical sectional view on the line 2—2 of Figure 1, showing the manner of passing the material between the rolls.

In pertusing sheets of ductile material, for example platinum or nickel, a sheet S is fed continuously between the rolls A and B which are continuously rotated in the proper direction, as indicated by arrows on Figure 2, and the rolls being pressed together, the teeth 3 penetrate or pierce the sheet and force the displaced portions thereof into the recesses or matrices 13, as clearly shown in Figure 2, to form pertusions 130. These displaced portions 14 form side walls for the corresponding openings and project from one side of the sheet. These side walls are of an aggregate surface area substantially equal to the area of the corresponding openings, and the pertused sheets thus remain of the same weight and aggregate surface areas as an imperforate sheet of the same dimensions. It will be observed that the pertusions are uniformly spaced, and that a large number of pertusions per unit of area can be produced. Also the rigidity of the sheet is increased by the projections 14 which are disposed edgewise to the sheet and to each other in rows extending across the sheet.

The above method and apparatus is capable of pertusing very thin, ductile material with great accuracy as to the dimension, spacing and number of the openings. As the recesses in roll B have continuous boundary walls which give support to all parts of the sheet being pertused, tearing and non-uniformity is prevented and the strains on the metal during pertusion are evenly distributed. As an illustration, by this method aluminum sheets .0005 inch thick with more than 4000 mesh openings per square inch have been produced.

Instead of having both of the pertusing members in the form of rolls, one may be a flat plate with a roll rotating in contact therewith. In this event a pinion on the roll meshes with a rack and the plate and suitable weights or other bias may be provided to hold the roll in engagement with the plate.

As shown, the pertusions are rectangular faced, that is they are rectangular in shape on the surface of the sheet, and the aggregate face area of said pertusions is greater than the aggregate area on the face of the sheet of the portions of the sheet between the pertusions, as shown in Figures 4 and 5. All portions of the sheet between the openings are substantially in the same common plane of the sheet, the openings are uniform in size and regular in shape and the walls 14 are flat, uniform and regular in shape. Apparently this is made possible by the firm support by the roll B of the portions of the sheet between the openings at all sides of the openings during the pertusing operation, and the positive moving of the displaced portions 14 under control between the opposed surfaces of the teeth 3 and the recesses 13 simultaneously with the formation of the openings, which results from the recesses being exact counterparts of the teeth.

It will be observed that if the teeth should be formed with flattened apexes, or if the rolls should be separated to a greater extent when passing the sheet therebetween, minute indentations are formed without penetration of the sheet, as illustrated in Figures 6 and 7 of the drawings, where the deformation consists of a plurality of depressions 16 at one side of the sheet and corresponding projections 17 at the other side. Such an operation results in hardening of the sheet and increases the rigidity or stiffness of very thin sheets of metal, especially in directions oblique to the rows of depressions. This operation is particularly advantageous where it is desired to obtain the maximum rigidity of extremely thin sheets of metal, without the perforation of the metal. The projections are also of advantage in spacing the adjacent convolutions of a spiral type catalyzer as is explained in more detail below.

In the drawings, the perforations or pertusions 130 are shown as approximately square and produced by teeth, the pitch of which in the two planes at right angles is the same. Should the pitch of the teeth in the two planes differ, the pertusions would have unequal sides. As clearly shown in Figure 2 of the drawings, the material is penetrated by the points of the individual teeth and then split into the four triangular-shaped segments or displaced portions 14 which have their apexes at the point of penetration. These four triangular-shaped segments are by proper shaping of the individual teeth spread apart as the rolling operation is completed, so that each segment is approximately at right angles to the plane of the sheet. The sheet thus produced has one smooth flat side, while the other side is covered with several hundred to several thousand triangular projections 14 per inch of surface area. Assuming that the sheet of material is .001 of an inch in thickness, these triangular projections extend about .008 of an inch above the face side of the sheet. Accordingly, when the sheet is to be used as a catalyzer in nitric acid production processes, the surface for contact between the metal and gases is greater by the area of these triangular projections than is attainable with woven wire screens of the same weight. Therefore, other conditions being equal, the cost of catalyzing metal per ton of nitric acid produced is less with this form of perforated sheet screen than with a woven wire screen.

From the foregoing it will appear that the sheet is a screen of the order of woven wire screens formed of wire of from, for example, about .0078 of an inch to about .0016 of an inch in diameter, and having from several hundred, say two hundred and twenty-five, perforations to several thousand perforations per square inch, which preferably are so spaced that the aggregate face areas of said perforations is substantially greater than the aggregate face areas of the portions of the sheet between the perforations. A perforated sheet of such thickness is of the general order of foil and metal leaf, but has much greater rigidity than an unpertused sheet of the same thickness, has a yielding resistance to bending which is substantially uniform in all directions, and has an aggregate surface area equal to or greater than that of an unpertused sheet of the same dimensions. The sheet has a minimum of material, a maximum of surface area and a maximum of rigidity which is uniform in all directions, such as is highly desirable especially for catalyzer screens.

The pertused sheet may be used in different ways in many different types of catalyzing apparatus. For example, as shown in Figures 8 to 10, the sheet may be embodied in a known type of catalyzing apparatus which includes an outer tube or casing 50 and an inner co-axial tube 51, which provide between them an annular inlet passage for the gases to be treated. The inner end of the inner tube 51 terminates short of the closed end 52 of the outer tube and has a perforate catalyzer unit 53 through which the gases pass from the outer tube into the inner tube.

In accordance with this invention, this catalyzer unit may be formed of a strip of the pertused metal of for example one centimeter in width and about eight ten-thousandths of an inch in thickness spirally coiled into the form of a grid as shown in Figure 9. The projections 14 at the sides of the pertused openings 130 hold the various convolutions of the spiral in spaced relation to provide a plurality of passages 54 through the grid approximately parallel with the axis thereof, and the openings 130 provide additional passages at approximately right angles to the passages 54. Thus the spirally coiled pertused strip provides thousands of minute passages for the gases being treated and intimate and prolonged contact of the gases with the catalytic metal is thereby insured. Known catalyzers of this general character include spirally wound plain, solid strips of catalytic material and separate transversely corrugated strips arranged in alternate relation, the corrugated strips holding the plain strips in spaced relation to provide passages between the strips through the corrugations. It has been found difficult to maintain uniformity of the spaced relation owing to the collapse of the corrugated strip at the temperature of reaction with resulting loss in efficiency of conversion. The use of my sheet eliminates the necessity for the corrugated strip and, moreover, provides many more passages for the gases and greater rigidity of structure and uniformity of area for gas transmitted.

Another form of catalyzer apparatus is shown in Figures 11 and 12, where a plurality of sheets of pertused metal are arranged in superposed relation transversely of a conduit 55 to form a screen 56 through which the gases to be treated are passed. The openings 130 of the sheet provide passages 57 for the gases transversely of the sheets and insure intimate and prolonged contact of the gases with the catalytic metal.

Remembering that the ideal catalytic grid or screen would have a minimum mass of material and openings of a size as near as possible to that of the component molecules of the mixed gases to be treated, and with elongated side walls to permit intimate and prolonged contact of the gases with the metal, it will be observed that my pertused sheet, as embodied in a catalyzer, closely approaches this ideal. The openings or passages may be extremely small and the portions 14, displaced at the sides of the openings, provide elongated side walls. Furthermore, the sheet is rigidified by these angular displaced portions. Accordingly, the sheet has a minimum of mass of metal with a maximum of exposed surface for contact with the gases, and substantial rigidity.

The indented or unperforated form of the sheet illustrated in Figures 6 and 7 may also be used in the form of catalyzer unit illustrated in Figures 13 and 14. When a strip of this indented sheet is spirally wound as indicated in Figure 13, the projections 17 serve to space the adjacent convolutions of the spiral from each other and provide tortuous passages 58 for the gases through the grid.

While the pertusions have been shown as rectilinear and specifically rectangular faced, they may be otherwise shaped as desired, for example, circular.

Having thus described my invention, what I claim is:

1. A catalytic agent for use in chemical processes involving the passage of fluids through perforated sheets of catalytic material, comprising a thin flexible sheet of ductile catalytic metal of a thickness of the order of foil having a plurality of rectangular faced pertusions of a number of the order of at least several hundred per square inch and so spaced that the aggregate face areas of said pertusions is substantially greater than the aggregate face areas of the portions of the sheet between the pertusions, each pertusion having a wall at each side thereof projecting integrally and angularly from one side of the sheet.

2. A catalytic agent for use in chemical processes involving the passage of fluids through perforated sheets of catalytic material, comprising a thin flexible sheet of ductile catalytic metal of a thickness of the order of foil having a plurality of rectangular faced pertusions of a number of the order of at least several hundred per square inch and so spaced that the aggregate face areas of said pertusions is substantially greater than the aggregate face areas of the portions of the sheet between the pertusions, each pertusion having a wall at each side thereof projecting integrally and angularly from one side of the sheet, and all portions of said sheet between said pertusions being substantially in the same common plane of the sheet.

3. A catalyzer screen comprising a sheet of ductile catalytic metal of a thickness of the order of foil having pertusions of a number of the order of several hundred per square inch and each pertusion including an opening having side walls projecting integrally and angularly from one side of the sheet, the other side of the sheet being substantially smooth, and the total area of the pertusions forming more than half the total area of the sheet.

EDWARD A. COLBY.